United States Patent [19]

Lerner et al.

[11] 4,073,304

[45] Feb. 14, 1978

[54] SYSTEM FOR CALIBRATING A PUMP

[75] Inventors: Julius Lerner, Broomall; Edmundo J. Iglesias, Lindwood, both of Pa.

[73] Assignee: Suntech, Inc., Wayne, Pa.

[21] Appl. No.: 704,204

[22] Filed: July 12, 1976

[51] Int. Cl.² .................... G01F 25/00; G05D 11/02
[52] U.S. Cl. .................................. 137/101.21; 73/3; 73/168
[58] Field of Search .................. 73/3, 168; 137/101.21

[56] References Cited

U.S. PATENT DOCUMENTS

| | | | |
|---|---|---|---|
| 2,566,742 | 9/1951 | Odell | 73/168 X |
| 2,859,611 | 11/1958 | Morse | 73/168 X |
| 3,216,434 | 11/1965 | Lovendahl | 137/101.21 X |
| 3,216,622 | 11/1965 | Drostholm | 73/3 X |
| 3,939,688 | 2/1976 | Misch et al. | 73/168 X |

*Primary Examiner*—Irwin C. Cohen
*Attorney, Agent, or Firm*—J. Edward Hess; Donald R. Johnson; Anthony Potts, Jr.

[57] ABSTRACT

A system for calibrating the flow rate of a pump, and especially designed for a pump which is normally used in a system to blend highly vaporous and odorous fluids, in which the blending fluid discharged from the pump is diverted from its normal flow stream into a closed calibration system which has a sight glass for receiving the fluid discharged by the pump. After a predetermined number of cycles by the pump, the amount of fluid within the sight glass is determined and then the calibration system is purged by a displacement gas so that the offensive material is returned back to its original source to be reused in its normal fashion.

4 Claims, 1 Drawing Figure

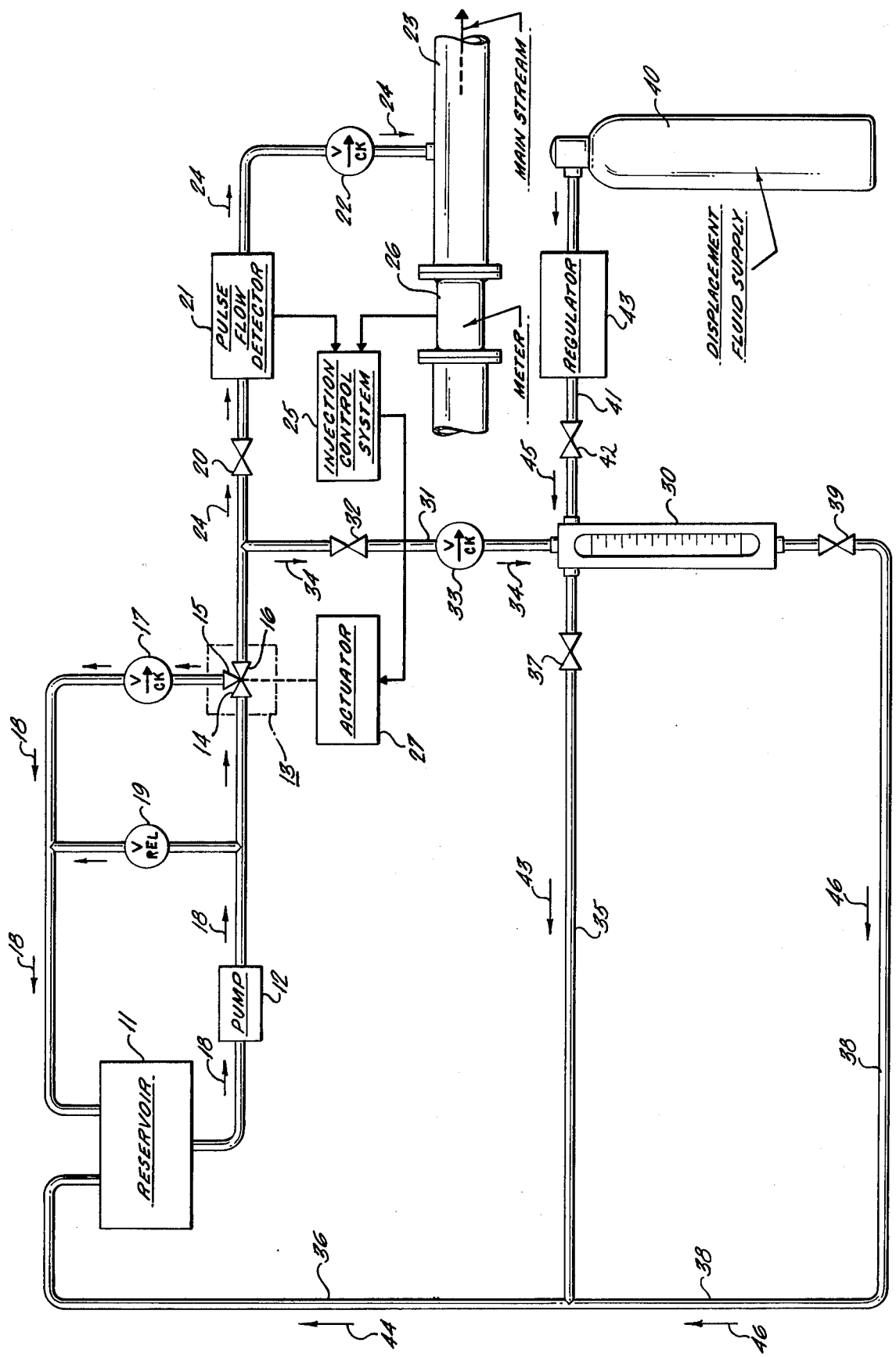

SYSTEM FOR CALIBRATING A PUMP

RELATION TO COPENDING APPLICATION

This application is related to a copending patent application entitled "Component Injection System", Ser. No. 556,026, filed Mar. 6, 1975, by Lerner and Mayer now U.S. Pat. No. 4,007,755.

BACKGROUND OF THE INVENTION

This invention is related to systems for calibrating the flow rate of fluid through a pump and more particularly to a calibration system for use in conjunction with a blending system utilizing a pump for injecting highly offensive and pollutant fluids which must be prevented from escaping into the atmosphere.

In some systems used in industrial processes today, the flow rate of a particular material through a line is determined primarily by the pump which is moving the material through the line instead of by controls responsive to a flowmeter. In such systems, it is necessary to calibrate this pump often to be assured that the flow rate being produced by the pump is that which is expected. One such system which requires such a calibration system is that which is disclosed in the copending patent application entitled "Component Injection System", Ser. No. 556,026, filed Mar. 6, 1975, by Lerner and Mayer. This component injection system is often used to control the injection of mercaptan or similar odorant substances into a stream of gas, such as propane, so as to provide an odor to the gas. Because of the viscous nature of mercaptan, and the low flow rates at which it is used, it is extremely hard to measure the flow rates and control it with normal metering and valve systems. Therefore, in this system a diaphragm pump is used to circulate the mercaptan around in a closed loop at a predetermined pulsed pumping rate, and then the loop is opened to a line connected to the mainstream of gas to be odorized, for a predetermined length of time at periodic intervals determined upon the flow rate of the mainstream. Therefore, to assure that the correct amounts of mercaptan are being injected into the mainstream, it is important to frequently calibrate the pump.

Under the old system, the calibration procedure has been quite an involved process due to the inherent characteristics of mercaptan. It has been the practice to completely clean out the entire lines of the injection system with a rinsing gas such as propane, so as to minimize the possibility of escape of mercaptan into the atmosphere. Then calibration of the pump is then accomplished by using a less volatile fluid. The pump is operated for a predetermined length of time and the amount of fluid which is pumped during this time is collected in an open container. Obviously, calibration of the injection system in this manner is a long drawn out process which results in extended down time for this system and still does not completely eliminate the possibility of air pollution.

SUMMARY OF THE INVENTION

In accordance with a preferred embodiment, a calibration system is provided which enables the injection system to be calibrated while it contains the blending gas, or odorant, without the need for flushing the injection system. This calibration system is designed to be entirely closed from the atmosphere to prevent air pollution by the odorant fluid, and includes a sight glass measuring system connected to receive the output from the pump under similar conditions as the injection into the mainstream takes place. The sight glass is connected with the odorant supply reservoir for the injection fluid and a displacement gas is provided for cleaning out the sight glass by returning the injection fluid back to the supply reservoir after a calibration test.

This calibration system offers the advantage that the injection system can be calibrated without the need for flushing, which in turn reduces the possibility of polluting the atmosphere as well as eliminates the need for a separate calibration fluid. In addition, the pump is calibrated with the actual liquid that is normally used in the injection process and it is calibrated under simulated operating conditions, thereby producing more reliable calibration data. Furthermore, reductions in waste of material and reductions in down time for calibration are produced.

A better understanding of this invention and its advantages can be seen in the following descriptions of the figures and preferred embodiment.

DETAILED DESCRIPTION OF THE DRAWINGS AND PREFERRED EMBODIMENT

The FIGURE provided is a schematic illustration of the preferred embodiment of the calibration system disclosed herein, interconnected with a component injection system, as provided in the aforesaid copending patent application.

An embodiment of the component injection system in the above-noted copending application is used to illustrate the preferred operation of the calibration system and is not intended to limit this invention to use on the component injection system, in as much as the concepts behind this calibration system would be applicable to many systems using pumps as well as for the purpose of calibrating a metering system.

A brief explanation of the component injection system will now be made. The component injection system is designed primarily for use to control the injection of a highly vaporous and odorous fluid, such as mercaptan, and is therefore designed to be a completely enclosed system to minimize the possibility of leaks to the atmosphere. The component injection system has a closed loop which includes a supply reservoir 11 for the storage of the injection fluid, a pump 12, a three-way diverting valve 13 with ports 14, 15 and 16, and a check valve or back pressure valve 17. In the non-injection mode, the injection fluid would be traveling from reservoir 11, through pump 12, ports 14 and 15 of valve 13, back pressure valve 17 and back to reservoir 11, as is shown by the arrows identified by the numeral 18. A pressure relief valve 19 is provided in parallel with valve 13 and back pressure valve 17 so that in the event pump 12 should continue to operate and the flow of injection fluid is prevented somewhere along the injection flow line, the pressure will be relieved by relief valve 19 allowing the injection fluid to return back to reservoir 11, without creating a dangerous situation. The relief pressure for relief valve 19 is selected to have a relief pressure greater than back pressure valve 17, so as not to affect the normal operation of the circuitous loop.

For the injection mode, diverting valve 13 obtains a second position wherein the injection fluid flows through ports 14 and 16 of valve 13, block valve 20, pulsed flow detector 21, back pressure valve 22, and into the mainstream pipeline 23, as is indicated by arrows 24.

An injection control system 25 is designed to actuate valve 13 in response to signals from flowmeter 26 in mainstream pipeline 23 so that a predetermined concentration of injected fluid i the mainstream fluid is produced. After a predetermined amount of fluid flows through flowmeter 26, control system 25 activates actuator 27 so that diverting valve 13 moves from position one, wherein the injection fluid is being pumped around the closed loop, to the second position, wherein the injection fluid is pumped through ports 14 and 16 of diverting valve 13 in a pulsed manner into the injection flow path, as indicated by arrows 24. Included within the injection control system 25 can be an alarm system (not shown) which receives signals from the pulsed flow detector 21 and compares this to the signal received from flowmeter 26 and produces an alarm signal in the event the ratio of pulses detected by detector 21 to the signals received from meter 26 varies from a predetermined standard. Further details as to the actual operation of the component injection system as well as possible designs for control systems for maintaining automatic control of the injection system are provided in the above-noted copending patent application.

The fluid flow calibration system which is the subject matter of this invention, includes a graduated sight glass measuring system 30 which is connected to outlet port 16 of valve 13 by way of line 31. Preferably, line 31 is connected to the top of sight glass 30 so that it is filled from the top during calibration tests. A block valve 32 is also provided in line 31 for the purpose of isolating the calibration system from the injection system. Preferably, a back pressure valve 33 is provided in line 31 with the same setting as back pressure valves 17 and 22 so that the resistance to pumping the injection fluid as seen by pump 12 remains the same regardless of which direction the injection fluid flows, thereby maintaining a more consistent flow rate with pump 12.

The top of sight glass 30 is connected to supply reservoir 11 through a vapor return line 35, line 36, and block valve 37, and serves to permit the vapor to return to reservoir 11. The bottom of sight glass 30 is also connected to supply reservoir 11 by means of liquid return line 38 and line 36, which are connected to the bottom of sight glass 30 through block valve 39.

A system for providing displacement gas to sight tube 30 so that it can be cleaned out after a calibration test is included in the invention. The displacement fluid supply means includes a pressurized source of the displacement fluid 40, which is connected to the top of sight glass 30 through line 41, which includes a block valve 42 and a pressure regulator 43.

The procedure for operating the calibration system will now be described. Under normal operation of the injection system, block valve 32 will be closed and block valve 20 will be opened so that the injection fluid can be injected into the mainstream pipeline 23 through the injection line. Once the decision is made to calibrate pump 12, block valve 20 is then moved to the closed position and block valve 32 is placed in the open position. At this time automatic control system 25 is turned off so actuation of the three-way diverting valve 13 can be accomplished manually.

The calibration system is placed in its first mode, which requires block valve 37 to be open and block valves 39 and 42 to be closed. Pump 12 remains in its operating mode so that injection fluid is circulated around the circuitous loop, in the direction illustrated by arrows 18. At this time, diverting valve 13 can be actuated to its second position so that the injection fluid flows from pump 12 through ports 14 and 16 of valve 13 and into line 31 of the calibration system, through block valve 32 and back pressure valve 33, into the top of sight glass 30. Diverting valve 13 is held in the second position for a predetermined length of time so that pump 12, if it is a diaphragm or piston pump, can operate for a predetermined number of cycles, or for a predetermined length of time if it is another type of pump. Then, diverting valve 13 is moved back to its first position wherein the injection fluid can continue to circulate around the closed loop. The gas displaced from sight glass 30 by the flow of injection liquid into the sight glass, flows from glass 30, through vapor return line 35, and into reservoir supply 11, as illustrated by arrows 43 and 44. At this time, the operator can examine sight glass 30 and determine by the graduated scale on its face the amount of injection fluid which was received. A comparison of this value with the cycles of pumping, provides the calibration test result.

At this time, block valve 32 can be moved back to the closed position and block valve 20 into the open position and the injection control system 25 can be activated so that normal injection can continue. At the same time, the flushing step for sight glass 30 can begin. This is accomplished by closing valve 37 and opening valves 39 and 42. The pressure provided by the displacement fluid from the displacement fluid supply 40 acts to force the liquid collected within sight glass 30 out through the liquid return line 38 and line 36, and back to the supply reservoir 11, as is indicated by arrows 45, 46, and 44. One example of displacement fluid could be nitrogen gas.

For purposes of calibrating the sight glass, the volume of fluid in sight glass 30 from valve 39 to the scale on the sight glass must be determined prior to completing construction. An alternative is to close valve 39 when the fluid level in sight glass 30 reaches a predetermined mark on the scale of sight glass 30 so that the same zero point is used for each calibration test of the pump.

While the example provided herein illustrates the use of the calibration system for an injection system with a pump, it can be appreciated that this same system could be used to calibrate a flowmeter, especially in the case of a flowmeter with a very low flow rate. The operation of the calibration system would be accomplished in essentially the same manner wherein the flow of fluid through the meter would be diverted into the sight glass of the calibration system for a predetermined length of time. The volume of fluid received by the sight glass can be determined and compared against the flow rate indicated by the meter over a given length of time.

While a particular embodiment of this invention has been shown and described, it is obvious that changes and modifications can be made without departing from the true spirit and scope of the invention. It is the intention of the appended claims to cover all such changes and modifications.

The invention claimed is:

1. A closed system for calibrating the pumping rate of a pump so that the fluid being pumped into the calibration system is returned to the fluid supply reservoir to be pumped again, said calibrating system comprising:
   (a) means for collecting the fluid being pumped by the pump, said collecting means having a scale for indicating the fluid level in the collecting means, and a first coupling at its upper level and a second coupling at its lower level;

(b) means for providing fluid communication between the first coupling and the reservoir to provide a vapor return line for the collecting means, thereby providing a path for the vapors in the collecting means to be displaced through when the pumped fluid is pumped into the collecting means;

(c) means for providing fluid communication between the second coupling and the reservoir to provide a liquid return line;

(d) means, connected to the collecting means for supplying displacement gas to the collecting means, so that the pumped fluid collected therein is displaced therefrom, back to the reservoir, through the liquid return line; and (e) means for diverting the flow of pumped fluid from the pump to the collecting means.

2. The calibration system recited in claim 1, wherein the displacement gas is nitrogen.

3. In a system for injecting a predetermined amount of a first fluid into a stream of a second fluid, said injection system comprising:

(a) a closed circuitous path;

(b) pumping means for circulating the first fluid around the closed circuitous path;

(c) reservoir means for the first fluid located in the circuitous path;

(d) means for diverting the flow of the first fluid from the closed circuitous path into the stream of second fluid; and (e) means for controlling the diverting means in response to the flow rate of the stream of second fluid;

an improvement for calibrating the pumping means, said calibration system comprising:

(f) means for collecting the fluid being pumped by the pump, said collecting means having a scale for indicating the fluid level in the collecting means, and a first coupling at its upper level and a second coupling at its lower level;

(g) means for providing fluid communication between the first coupling and the reservoir to provide a vapor return line for the collecting means, thereby providing a path for the vapors in the collecting means to be displaced through when the pumped fluid is pumped into the collecting means;

(h) means for providing fluid communication between the second coupling and the reservoir to provide a liquid return line;

(i) means, connected to the collecting means for supplying displacement gas to the collecting means, so that the pumped fluid collected therein is displaced therefrom, back to the reservoir, through the liquid return line; and (j) means for diverting the flow of pumped fluid from the pump to the collecting means.

4. The calibration system recited in claim 3, wherein the displacement gas is nitrogen.

* * * * *